(12) United States Patent
Mahler et al.

(10) Patent No.: US 12,037,821 B2
(45) Date of Patent: Jul. 16, 2024

(54) ILLUMINATED LATCH

(71) Applicant: ILLINOIS TOOL WORKS INC., Glenview, IL (US)

(72) Inventors: Constantin Mahler, Volkach (DE); Thomas Lechner-Watzlik, Heppenheim (DE)

(73) Assignee: Illinois Tool Works Inc., Glenview, IL (US)

( * ) Notice: Subject to any disclaimer, the term of this patent is extended or adjusted under 35 U.S.C. 154(b) by 1000 days.

(21) Appl. No.: 16/985,934

(22) Filed: Aug. 5, 2020

(65) Prior Publication Data

US 2021/0040783 A1    Feb. 11, 2021

Related U.S. Application Data

(60) Provisional application No. 62/884,377, filed on Aug. 8, 2019.

(51) Int. Cl.
*E05B 83/34* (2014.01)
*E05B 83/30* (2014.01)
(Continued)

(52) U.S. Cl.
CPC .............. *E05B 83/34* (2013.01); *E05B 83/30* (2013.01); *E05B 83/32* (2013.01); *E05C 19/022* (2013.01);
(Continued)

(58) Field of Classification Search
CPC .......... E05B 83/34; E05B 83/30; E05B 83/32; E05B 17/10; E05C 19/022; E05Y 2201/22; E05Y 2201/232; E05Y 2201/244; E05Y 2201/426; E05Y 2201/474; E05Y 2800/11; E05Y 2900/00; Y02T 10/70; Y02T 10/7072; Y02T 90/14
See application file for complete search history.

(56) References Cited

U.S. PATENT DOCUMENTS

| 8,998,271 B2 | 4/2015 | Beck |
| 9,616,745 B2 | 4/2017 | Beck |

(Continued)

FOREIGN PATENT DOCUMENTS

| CN | 102957063 A | * | 3/2013 | .............. B60L 53/16 |
| DE | 102011108817 A1 | | 8/2012 | |

(Continued)

OTHER PUBLICATIONS

Foreign reference.*

(Continued)

*Primary Examiner* — Elmito Breval
(74) *Attorney, Agent, or Firm* — Quarles & Brady LLP

(57) ABSTRACT

A system for a replenishment door of a vehicle includes a body having a port and defining a latch aperture, a door pivotably attached to the body with a hinge, a system controller, and a latch assembly. The door is pivotable between a closed position and an open position. The latch assembly is configured for securing the door to the housing in the closed position. Further, the latch assembly includes a housing and a light source disposed within the housing, the light source being configured to project light through the housing, and the system controller being configured to control an intensity of the light source.

19 Claims, 7 Drawing Sheets

(51) Int. Cl.
*E05B 83/32* (2014.01)
*E05C 19/02* (2006.01)

(52) U.S. Cl.
CPC ..... *E05Y 2201/22* (2013.01); *E05Y 2201/232* (2013.01); *E05Y 2201/244* (2013.01); *E05Y 2201/426* (2013.01); *E05Y 2201/474* (2013.01); *E05Y 2400/3013* (2024.05); *E05Y 2900/00* (2013.01)

(56) References Cited

U.S. PATENT DOCUMENTS

| | | | |
|---|---|---|---|
| 9,631,403 B2 | 4/2017 | Beck | |
| 2011/0043355 A1* | 2/2011 | Chander | B60K 15/05 320/109 |
| 2021/0207419 A1* | 7/2021 | Sorice | E05F 15/611 |

FOREIGN PATENT DOCUMENTS

| | | |
|---|---|---|
| DE | 102011006478 A1 | 10/2012 |
| DE | 102017126722 A1 | 11/2018 |
| DE | 102017213369 A1 | 2/2019 |
| WO | 2012/158916 A1 | 11/2012 |

OTHER PUBLICATIONS

Office Action from corresponding German Patent Application No. 10 2020 120 886.3, dated Sep. 16, 2021 (16 pages) (English-machine translation included).

* cited by examiner

ILLUMINATED LATCH

RELATED APPLICATIONS

This application relates to and claims priority to U.S. Provisional Application No. 62/884,377 filed on Aug. 8, 2019, which is hereby incorporated by reference in its entirety.

FIELD OF THE DISCLOSURE

Embodiments of the present disclosure generally relate to vehicle panel components, and, more particularly, to an illuminated latch.

BACKGROUND

In recent years, interfaces have been developed to replenish energy sources for vehicles, such as, e.g., fuel tanks or charging receptacles. Certain known energy replenishment systems have a housing that connects to a body of the vehicle and supports an energy connector, such as, e.g., a fuel nozzle or a charging plug. These replenishment interfaces also include a door pivotably attached to the housing to selectively cover the energy connector. In some instances, the housing and the door include mating latch components to secure the door in a closed position to the housing.

However, these known energy replenishment interfaces have drawbacks. For example, they do not aid drivers in connecting an energy source to the energy connector in a darkened location. Further, these energy replenishment interfaces do not indicate an energy status of the vehicle. Therefore, a need exists for an energy replenishment interface that aids drivers in connecting an energy source to the energy connector in a darkened location and that indicates an energy status of the vehicle.

SUMMARY

In one aspect, the present disclosure provides a system for a replenishment door of a vehicle. The system includes a body having a port and defining a latch aperture. The system further includes a door, a system controller, and a latch assembly. The door is pivotably attached to the body with a hinge, the door being pivotable between a closed position and an open position. The latch assembly is configured for securing the door to the housing in the closed position. Further, the latch assembly includes a housing and a light source disposed within the housing, wherein the light source is configured to project light through the housing, and wherein the system controller is configured to control an intensity of the light source.

In another aspect, the present disclosure provides a latch assembly for use with a door system for a replenishment door of a vehicle. The door system includes a body having a replenishment port and a latch aperture, a door being removably attached to the body, and a system controller. The latch assembly includes a housing, a light ring extending from the housing to define a cylindrical protrusion, and a light source disposed within the housing and configured to project light through the housing and the light ring. The light ring is configured to at least partially extend through the latch aperture so that the light source illuminates at least a portion of the body circumscribing the latch aperture.

In another aspect, the present disclosure provides a door system for a replenishment door of a vehicle. The door system includes a body having a replenishment port and a latch opening, the replenishment port being configured for receiving a charging plug or refuel nozzle to replenish the vehicle. The door system also includes a door pivotably attached to the housing with a hinge, a controller, a sensor, and a latch assembly. The door is pivotable between a closed position and an open position, and the sensor is configured to detect at least one operating condition of the door system. The latch assembly is configured for securing the door to the housing in the closed position. Further, the latch assembly includes a housing, a light ring extending from the housing to define a cylindrical protrusion, and a light source disposed within the housing and configured to project light through the housing and the light ring so that at least a portion of the body adjacent the latch opening is illuminated. Further, the controller is configured to control an intensity of the light source in response to the condition detected by the sensor.

Figure 1:
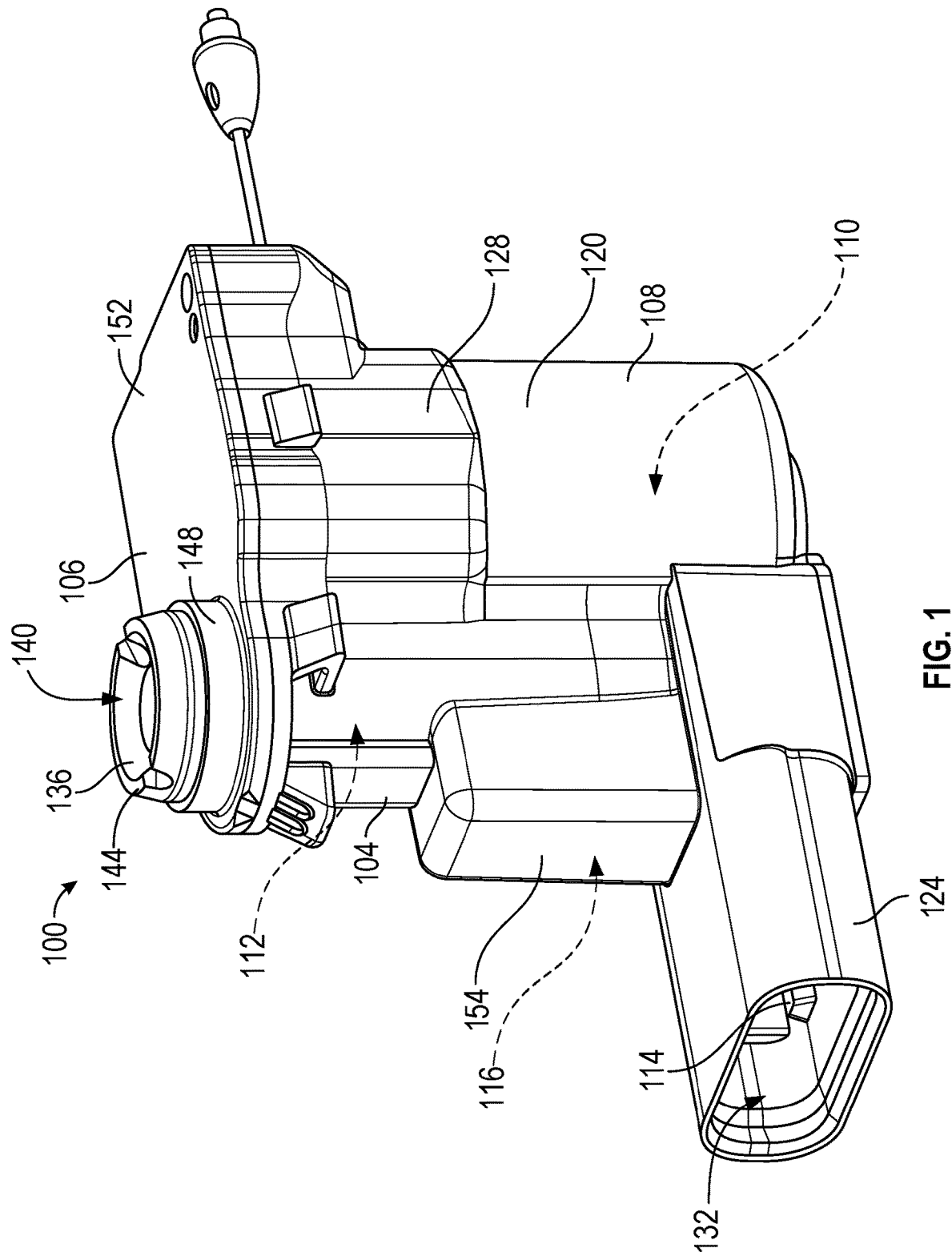
FIG. 1 is an isometric view of a latch assembly according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Embodiments of the present disclosure provide a latch assembly that may aid drivers in connecting an energy source, e.g., a fuel nozzle or an electrical plug, to an energy connector, e.g., a fuel filler tube or a charging receptacle, of a vehicle. Embodiments of the present disclosure may be particularly useful when connecting an energy source to a vehicle in a darkened location. Additionally, embodiments of the present disclosure may indicate an energy status of the vehicle. That is, embodiments of the present disclosure may provide visual indication of a replenishment status to the user.

As used herein, "replenishment" and variations thereof may equate to "refill" or "refuel" in connection with the type of vehicle being replenished. That is, "replenishment" for a gas vehicle may correlate to "refueling" the vehicle, whereas "replenishment" of an electric vehicle may involve "recharging" the vehicle. It is to be appreciated that embodiments of the present disclosure may be configured for use with both electric vehicle and gas vehicle applications. Accordingly, throughout the specification, the word "replenishment" and variations thereof may be replaced with "refuel" and variations thereof for gas vehicles. Similarly, the word "replenishment" and variations thereof throughout the specification may be replaced with "recharge" and variations thereof for electric vehicles.

FIGS. 1-9 illustrate a latch assembly 100 according to an embodiment of the present disclosure. Referring to FIG. 1, the latch assembly 100 includes a housing 104 that may be a molded element. For example, the housing 104 may be formed of a first piece 106 and a second piece 108 that are configured to couple to each other. In some embodiments, the first piece 106 and the second piece 108 may be connected via latches, fasteners, threads, or the like. However, the housing according to additional embodiments of the present disclosure may be constructed of one or more molded components. The housing 104 may define an internal cavity 110 for housing various internal components. In the embodiment illustrated, the latch assembly 100 further includes a lock assembly 112, a connector 114, and a light source 116, each of which may be disposed within the internal cavity 110 of the housing 104. More specifically, the lock assembly 112 is positioned within a portion of the housing 104 that defines a partially cylindrical body 120. The housing 104 may further include an elliptic cylindrical extension 124 that extends from a main body 128 of the housing 104 to a free, open end 132. The elliptic cylindrical extension 124 may retain the connector 114, and the free, open end 132 may allow access to the connector 114. Consequently, wires or a plug may be inserted into the free, open end 132 of the elliptic cylindrical extension 124 to connect to the connector 114. Moreover, the main body 128 of the housing 104 may be used to hold or surround the light source 116, which could be a lamp or other light emissive structure, and the light source 116 may be configured to emit light through the housing 104.

Figure 2:
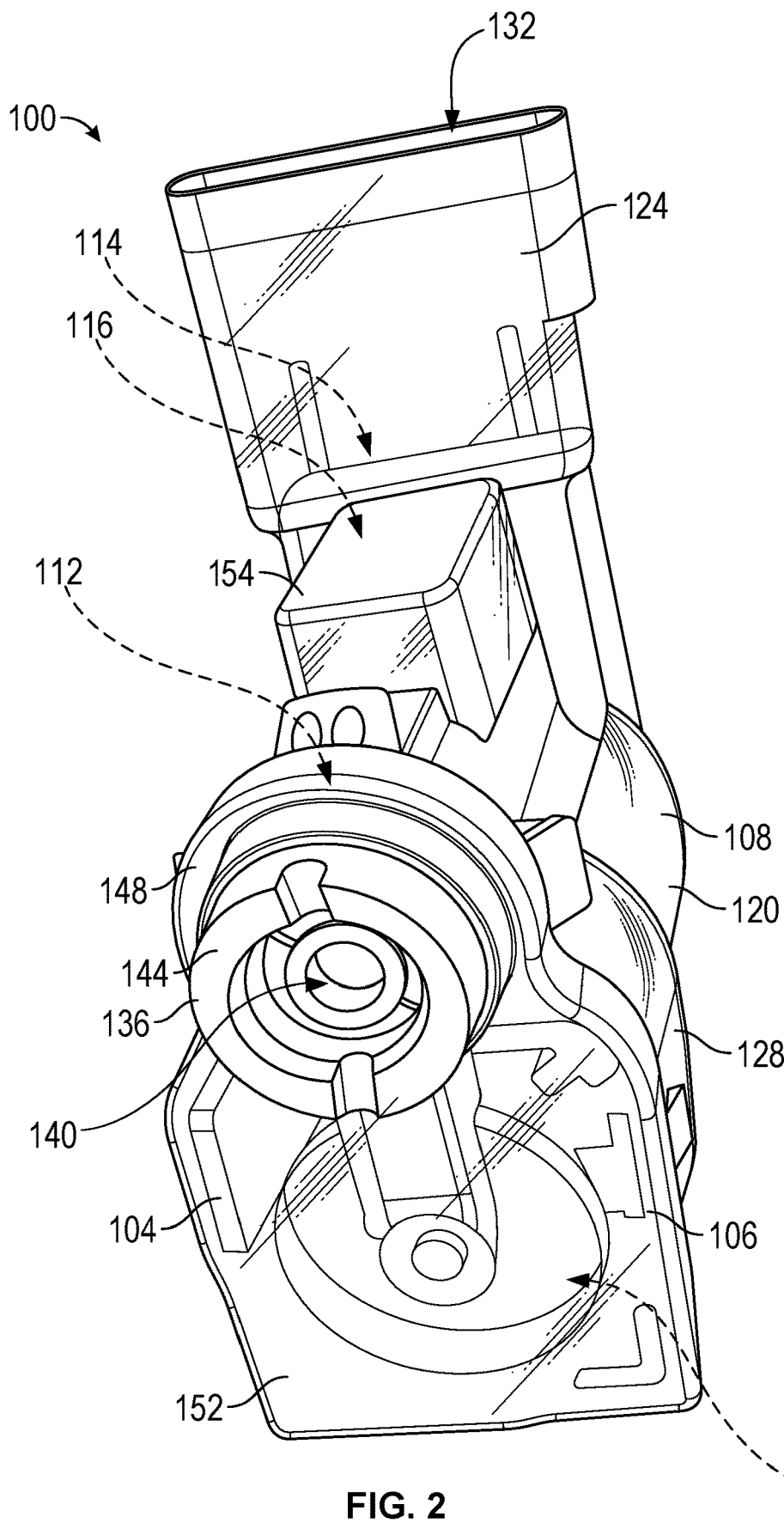
FIG. 2 is another isometric view of the latch assembly of FIG. 1.

Turning to FIG. 2, the latch assembly 100 may further include a light ring 136 that defines an opening 140 to the internal cavity 110. As shown in the illustrated embodiment, the light ring 136 may be unitarily formed with the housing 104. However, in some embodiments, the light ring may be formed separately from the housing. That is, in some embodiments, the light ring may be molded or glued to the housing. Further, in some embodiments, the light ring may be secured or coupled to the housing with fasteners, or the light ring may include threads, which may be configured to mate with threads on the housing. The light ring 136 extends from the main body 128 to define a cylindrical protrusion 144 having a shoulder 148 disposed at a junction with the main body 128. More specifically, the light ring 136 extends from a mounting plateau 152 of the housing 104.

Still referring to FIG. 2, the opening 140 defined by the light ring 136 may be configured to receive and retain a locking pin (not shown) to latch components together. That is, the light ring 136 and the opening 140 may act as a female coupling component of the latch assembly 100. As will be discussed further herein, the light ring 136 according to the illustrated embodiment may be configured to receive and retain a locking pin extending from a movable door.

Figure 3:
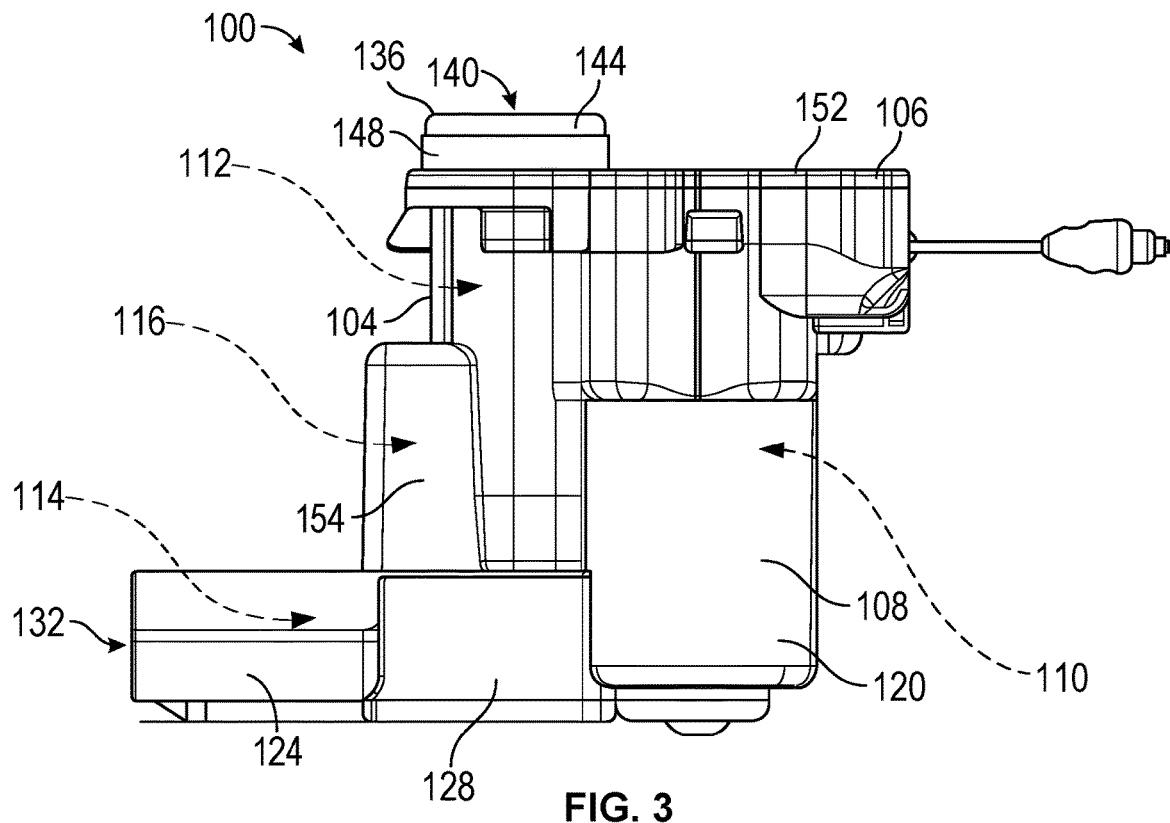
FIG. 3 is a side elevational view of the latch assembly of FIG. 1.

Turning to FIG. 3, the housing 104 may include the main body 128, the cylindrical protrusion 144, the shoulder 148, the mounting plateau 152, the elliptic cylindrical extension 124, and the partially cylindrical body portion 120. The mounting plateau 152 may be a substantially planar surface that is proximate the light ring 136. In some embodiments, the free, open end 132 of the light ring 136 may be disposed in a plane that is substantially parallel to the mounting plateau 152. The cylindrical protrusion 144 and the partially cylindrical body portion 120 may be arranged such that they axially extend along substantially parallel axes. Further, the elliptic cylindrical extension 124 may be arranged such that it extends along an axis substantially perpendicular to the axes of the cylindrical protrusion 144 and the partially cylindrical body portion 120. According to the embodiment illustrated, the light source 116 may be disposed within a portion of the housing 104 that is a substantially rectangular protrusion 154 extending from the main body 128 proximate the elliptic cylindrical extension 124. For example, in some embodiments, the rectangular protrusion 154 and the elliptic cylindrical extension 124 may be contiguous structures. However, alternative embodiments may include the light source positioned in different areas of the housing. Further, in alternative embodiments, the region of the housing that holds the light source may be sized and/or shaped differently than shown herein.

Figure 4:
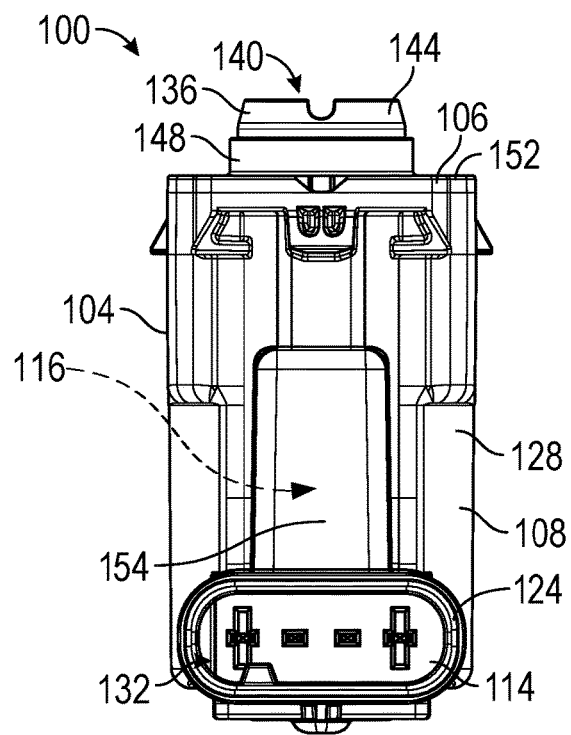
FIG. 4 is a top plan view of the latch assembly of FIG. 1.
Figure 5:
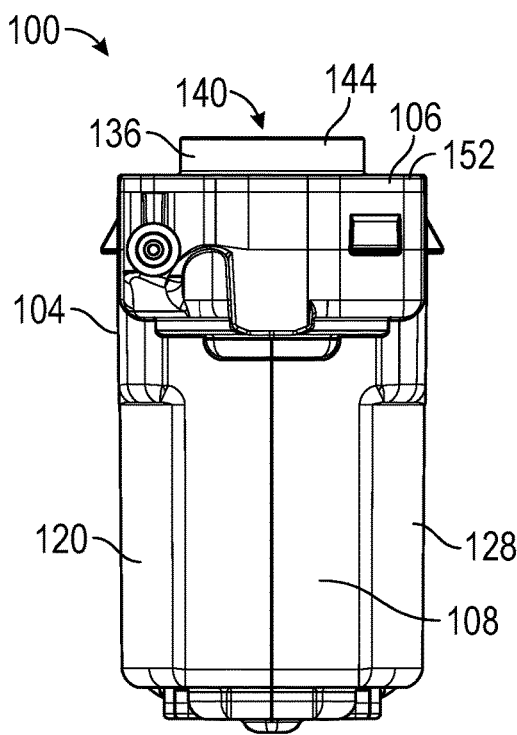
FIG. 5 is a bottom plan view of the latch assembly of FIG. 1.
Figure 6:
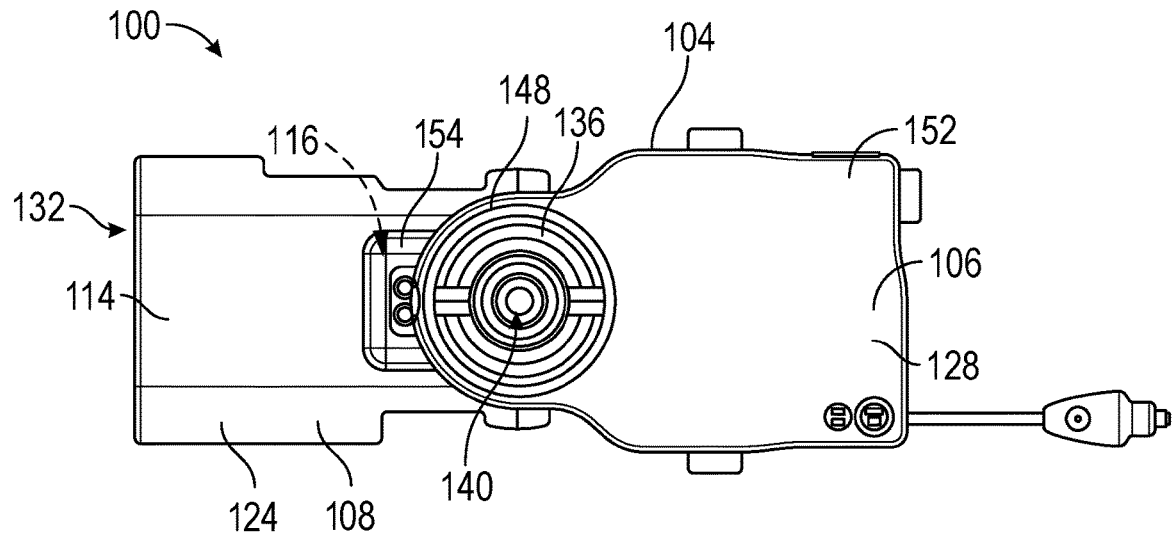
FIG. 6 is a front elevational view of the latch assembly of FIG. 1.
Figure 7:
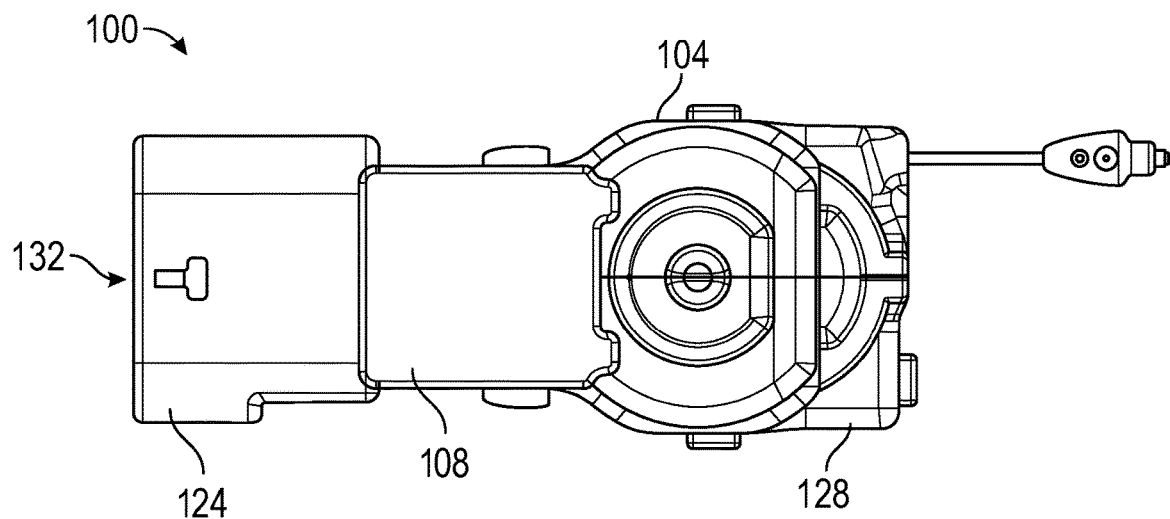
FIG. 7 is a rear elevational view of the latch assembly of FIG. 1.

Turning to FIG. 4, as discussed above, the elliptic cylindrical extension 124 is configured to retain the connector 114. In some embodiments, the connector 114 is configured to receive or couple to a plug or wires (not shown). For example, the connector 114 may receive a plug or wires from a power supply that is configured to provide power to the light source 116. Further, in some embodiments, the connector 114 may connect to a circuit board or controller for controlling the lock assembly 112.

Figure 8:
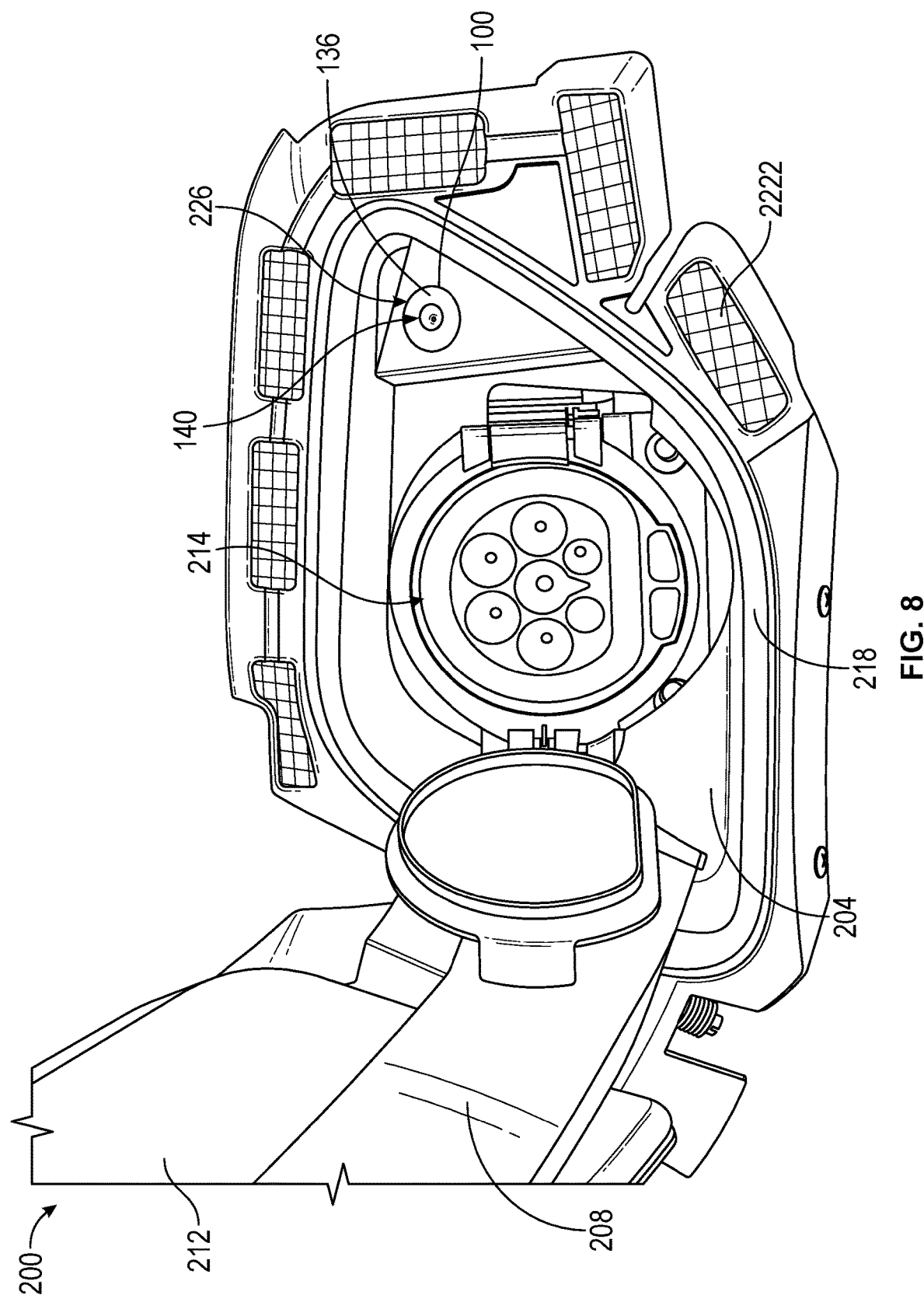
FIG. 8 is a partial front view of the latch assembly of FIG. 1 installed in a door system of a vehicle.

FIG. 8 illustrates the latch assembly 100 installed into a door system 200 according to an embodiment of the present disclosure. In the embodiment illustrated, the door system 200 is a recharge door system for an electric vehicle. However, embodiments of the present disclosure may be incorporated into a variety of systems. For example, the latch assemblies according to some embodiments may be used with fuel door systems for gas vehicles. Further, the latch assemblies according to embodiments of the present disclosure may be used for door systems not related to vehicle replenishment. For example, embodiments may be particularly useful on vehicle body doors, hood doors, trunk doors, glove compartments, center consoles, etc. Moreover, latch assemblies according to embodiments of the disclosure may be used in non-vehicle applications. For example, the latch assemblies may be used for refrigeration applications, electrical cabinet installations, security systems, or the like.

In the illustrated embodiment, the door system 200 includes a body 204, a door 212, and a hinge 208, the hinge 208 coupling the door 212 to the body 204 so that the door 212 is pivotably and removably attached to the body 204. Therefore, the door 212 may be pivotable or movable between an open position and a closed position. The body 204 may define a port 214, which may be a replenishment port that defines an opening for an electrical charge plug or fuel nozzle to be inserted therethrough. In some embodiments, the door 212 may be configured to substantially cover the port 214 of the body 204 in the closed position and substantially unobstruct the port 214 of the body 204 in the open position. Further, in the closed position, the door 212 may at least partially contact or abut a seating shoulder 218 disposed at least partially around the port 214. The body 204 of the door system 200 may further include a mounting flange 222 that may be used to mount the body 204 of the door system 200 to the vehicle.

Figure 9:
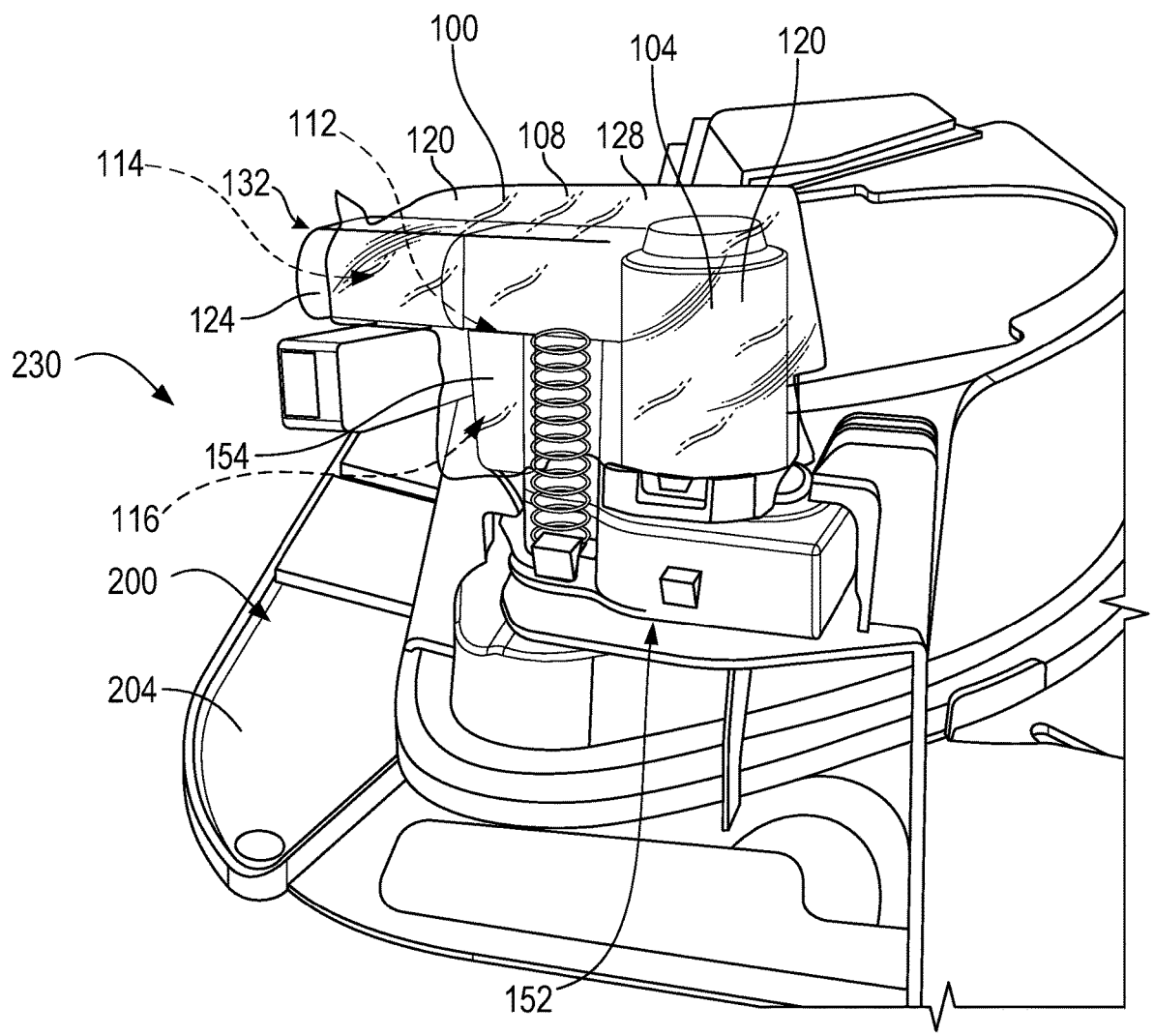
FIG. 9 is a perspective view of the latch assembly of FIG. 1 installed in the door system of FIG. 8.

Still referring to FIG. 8, the body 204 of the door system 200 may define a latch aperture 226. Generally, the latch aperture 226 may be sized for, and configured for use with, the latch assembly 100 (see, e.g., FIG. 9). More specifically, the latch assembly 100 may be mounted or connected to the door system 200 so that the light ring 136 is adjacent the latch aperture 226. Preferably, in some embodiments, the light ring 136 is substantially concentric with the latch aperture 226. In some embodiments, the latch assembly 100 may at least partially extend through the latch aperture 226. In some embodiments, the light ring 136 may be positioned within or adjacent the latch aperture 226 so that the light ring 136 is visible to a driver or other user who is positioned outside of the vehicle when the door 212 is in the open position. Accordingly, as best seen in FIG. 9, the latch assembly 100 may be assembled with the door system 200 so that it is disposed on an interior side 230 of the door system 200 when installed in the vehicle. Differently said, the latch assembly 100 may be closer to an interior of the vehicle than the door 212 or body 204 of the door system 200 when installed into the vehicle. The mounting plateau 152 of the latch assembly 100 may be configured to abut or contact the interior side 230 of the body 204, and the latch assembly 100 may be attached to the body by way of a plurality of means, such as, e.g., fasteners, clamps, latches, adhesives, or the like.

With continued reference to FIG. 9, in some embodiments, the housing 104 of the latch assembly 100 may preferably be constructed of transparent and/or translucent polymers. For example, the housing 104 may at least, in part, be constructed of transparent or translucent acrylic, polycarbonate, butyrate, and/or polyethylene. Thus, in operation, when the light source 116 is illuminated, light produced by the light source 116 diffuses and refracts through the housing 104. In other words, the housing 104 may act as a diffusing shade for the light source 116. In some embodiments, only a portion of the housing 104 may be transparent and/or translucent. In some embodiments, referring again to FIG. 8, the light ring 136 may be the only component of the latch assembly 100 that is transparent and/or translucent. Consequently, the light ring 136 may diffuse light from the light source 116 (see, e.g., FIG. 9) to illuminate the body 204, the hinge 208, the door 212, and the replenishment port 214. The light ring 136, thus, may aid a driver or other person in locating the replenishment port 214 when the vehicle is in a darkened location, such as, e.g., a garage, outside at night, a parking structure, etc.

As mentioned above, the door 212 may include a locking pin (not shown) that is configured to be received and retained by the latch assembly 100. More specifically, when the door 212 is in the closed position, the locking pin may extend into the opening 140, and the lock assembly 112 (see, e.g., FIG. 8) may lock the pin therein. Returning to FIG. 8, generally, the lock assembly 112 may be an actuation device for locking the door 212 in the closed position. In some embodiments, the lock assembly 112 is a push-push type locking mechanism. In some embodiments, the lock assembly 112 is a locking push-push (LPP) locking mechanism. For example, embodiments of the present disclosure may be used with locking mechanisms disclosed by U.S. Pat. No. 9,631,403, PCT Publication No. WO2012/158916, U.S. Pat. No. 8,998,271, and/or U.S. Pat. No. 9,616,745, each of which is incorporated herein by reference. The lock assembly 112 may be any other type of locking mechanism known by persons of ordinary skill in the art.

Figure 10:
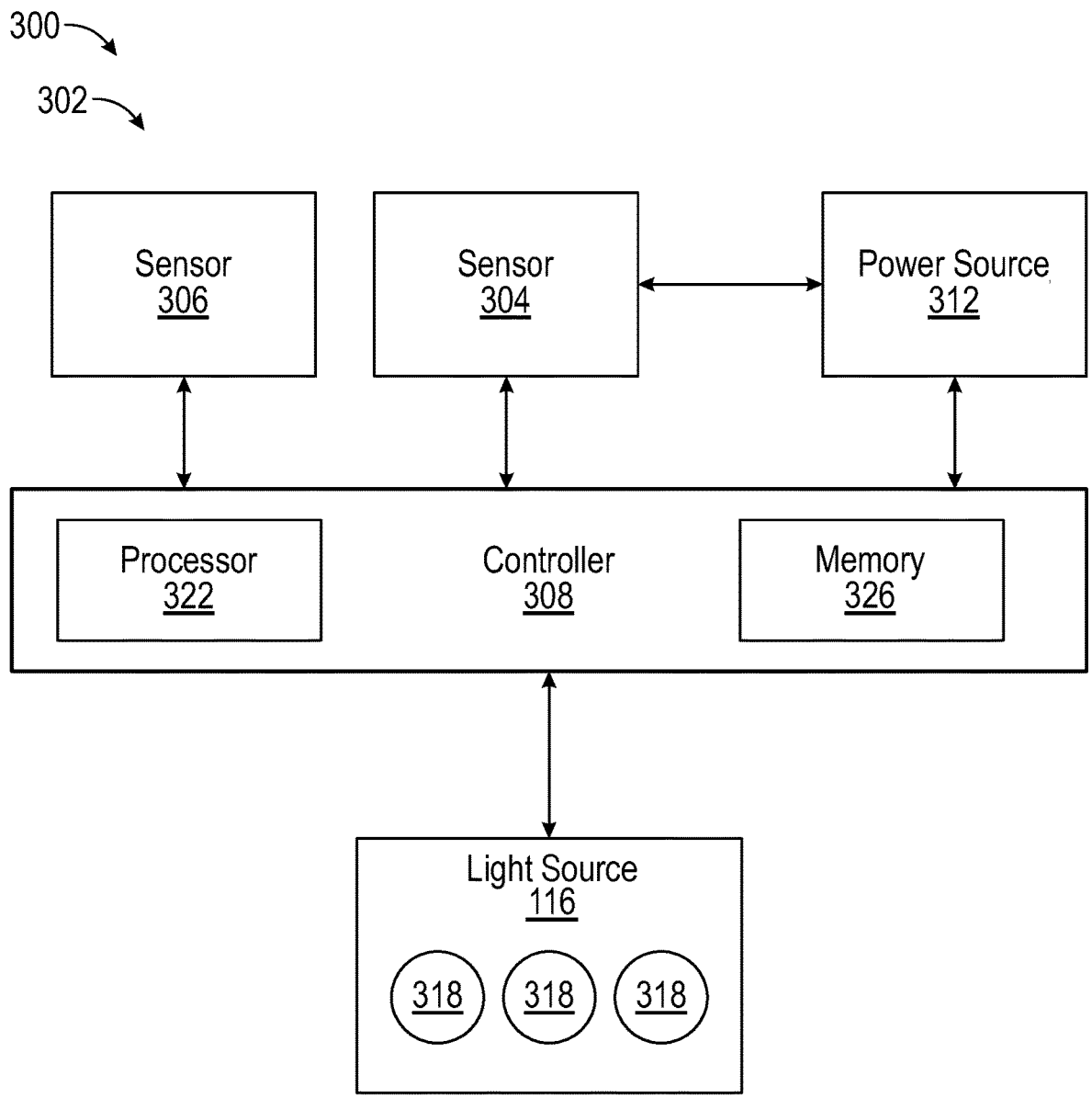
FIG. 10 is a block diagram of electronic components of a vehicle including the latch assembly of FIG. 1.

Turning to FIG. 10, the latch assembly 100 may be used in a system 300 having a plurality of components 302, such as electronic components of a vehicle. For example, the electronic components 302 may include a first sensor 304, a second sensor 306, a controller 308, and the light source 116. In the embodiment illustrated, the system 300 further includes a power source 312, which provides power to the vehicle. That is, the power source 312 may also be referred to as a replenishment bank, which stores power during the replenishment process. In gas vehicle installations, the power source may be a fuel tank of the vehicle. As discussed above, the light source 116 can include one or more discrete light sources 318. For example, in some embodiments, the light source may include one or more light emitting diodes. In some embodiments, the light source may include one or more incandescent light bulbs. The controller 308 preferably includes a processor 322 and a memory 326. The controller 308 may be in communication with the first sensor 304, the second sensor 306, the power source 312, and the light source 116, and the first sensor 304 may be in communication with the power source 312. The second sensor 306 can be connected to the door 212 (see, e.g., FIG. 8). In some embodiments, the first sensor 304 is in communication with the controller 308. In some embodiments, the second sensor 306 is in communication with the controller 308.

Still referring to FIG. 10, in operation, the first sensor 304 may measure a replenishment status (e.g., a voltage or a fuel level) of the power source 312. That is, the first sensor 304 may be configured to detect the replenishment status and report the status to the controller 308. Accordingly, the controller 308 may be configured to control the light source 116 according to the reported replenishment status. For example, an intensity of the light source 116, a pulse sequence of the light source 116, a flash pattern of the light source 116, and/or a color of the light source 116 may be varied by the controller 308 to demonstrate the current replenishment status. In some embodiments, the controller 308 may selectively turn the light source 116 on and off. In some embodiments, the controller 308 may selectively illuminate one or more of the discrete light sources 318 according to predetermined energy status thresholds and/or ranges stored in the memory 326. In some embodiments, the controller 308 may selectively illuminate the light source 116 one or more colors (e.g., red, green, yellow, etc.) according to the predetermined energy status thresholds and/or ranges.

With continued reference to FIG. 10, in operation, the second sensor 306 may be a proximity sensor that is configured to measure a position, e.g., open or closed, of the door 212 (see, e.g., FIG. 10). The second sensor 306 may report the detected door position to the controller 308, and the controller 308 may be configured to illuminate the light source 116 accordingly. That is, the second sensor 306 may be configured to detect a position of the door and report the position of the door to the controller 308, and the controller 308 may be configured to control the light source 116 according to the position of the door. Similar to the replenishment status discussed above, the controller 308 may be configured to vary an intensity, a pulse sequence, a flash pattern, and/or a color of the light source 116 to indicate the current door position. For example, in some embodiments, the controller 308 may turn the light source 116 off when the second sensor 306 reports the closed position. In some embodiments, the controller 308 may turn the light source 116 on when the second sensor 306 reports the open position.

Still referring to FIG. 10, in some embodiments, a sensor may be used to detect ambient light. For example, in some embodiment, at least one of the first sensor 304 and the second sensor 306 may be configured to detect an ambient light intensity. More specifically, at least one of the first sensor 304 and second sensor 306 may detect the ambient light intensity and report the intensity to the controller 308, and the controller 308 may be configured to control the intensity of the light source 116 according to the detected ambient light intensity. An intensity of the light source 116, a pulse sequence of the light source 116, a flash pattern of the light source 116, and/or a color of the light source 116 may be varied by the controller 308 according to the detected ambient light. For example, in some embodiments, the controller 308 may increase a brightness of the light source 116 if a low ambient light intensity is detected when the door is in the open position. In some embodiments, the controller 308 may decrease a brightness of the light source 116 if a high ambient light intensity is detected. It should be appreciated that either the first sensor 304 or the second sensor 306 may be configured to provide at least one of the aforementioned features. Further, in some embodiments, the first sensor 304 and the second sensor 306 may be configured to provide other features known in the art. Moreover, more sensors or fewer sensors than the first sensor 304 and the second sensor 306 discussed herein may be used in embodiments of the present disclosure.

From the foregoing, it will be appreciated that the exemplary latch assembly 100 described above may illuminate a replenishment port of a vehicle. Additionally, the latch assembly 100 may illuminate based on an energy status of the vehicle. Thus, the latch assembly 100 may aid drivers in connecting a recharge connector or refuel nozzle to a replenishment port of a vehicle in a darkened location and/or indicate the energy status to the driver.

While various spatial and directional terms, such as top, bottom, lower, mid, lateral, horizontal, vertical, front, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A system for a replenishment door of a vehicle, the system comprising:
    a body having a port and defining a latch aperture;
    a door pivotably attached to the body with a hinge, the door being pivotable between a closed position and an open position;
    a system controller; and
    a latch assembly configured to partially extend through the latch aperture and for secure the door to the body in the closed position, wherein the latch aperture is configured for use with the latch assembly,
    wherein the latch assembly includes a light ring that is concentric with the latch aperture, and a housing having a light source disposed within the housing, wherein the light source is configured to project light through the housing, and wherein the system controller is configured to control an intensity of the light source.

2. The system of claim 1, wherein the light ring extending from the housing defines a cylindrical protrusion, wherein the cylindrical protrusion is configured to at least partially extend through the latch aperture.

3. The system of claim 2, wherein the light source is configured to project light through the light ring so that a region of the body proximate the latch aperture is at least partially illuminated.

4. The system of claim 3, wherein the light source includes one or more light emitting diodes.

5. The system of claim 3, wherein the light source includes one or more incandescent light bulbs.

6. The system of claim 3 further comprising a sensor that is configured to detect a replenishment status, and wherein the system controller is configured to control the intensity of the light source according to the replenishment status.

7. The system of claim 6, wherein the system controller is configured to vary a color of the light source to indicate the replenishment status.

8. The system of claim 3 further comprising a sensor that is configured to detect a position of the door, wherein the door is configured to cover the port of the body in the closed position and unobstruct the port of the body in the open position, and wherein the system controller is configured to control the intensity of the light source according to the position of the door.

9. The system of claim 8, wherein the light source is configured to illuminate an area surrounding the latch assembly when the door is in the open position.

10. The system of claim 3 further comprising a sensor that is configured to detect an ambient light intensity, and wherein the system controller is configured to control the intensity of the light source according to the detected ambient light intensity.

11. The system of claim 1, wherein the housing and the light ring are constructed of a transparent or translucent polymer.

12. A latch assembly for use with a door system for a replenishment door of a vehicle, the door system including a body having a replenishment port and a latch aperture, a door being removably attached to the body, and a system controller, the latch assembly comprising:
    a housing;
    a light ring extending from the housing to define a cylindrical protrusion, wherein the light ring is configured to receive and retain a locking pin extending from the door;
    a light source disposed within the housing and configured to project light through the housing and the light ring; and a sensor that is configured to detect an ambient light intensity, and wherein the system controller is configured to control the intensity of the light source according to the detected ambient light intensity, wherein the light ring is configured to at least partially extend through the latch aperture so that the light source illuminates at least a portion of the body circumscribing the latch aperture.

13. The latch assembly of claim 12 further comprising a connector for connecting the latch assembly to a power supply, the power supply being configured to power the light source.

14. The latch assembly of claim 12, wherein the system controller of the door system is configured to control an intensity of the light source.

15. The latch assembly of claim 14, wherein the door system further includes a sensor that is configured to detect a replenishment status, and wherein the system controller is configured to control the intensity of the light source according to the replenishment status.

16. The latch assembly of claim 15, wherein the system controller is configured to vary a color of the light source to indicate the replenishment status.

17. The latch assembly of claim 14 further comprising a sensor that is configured to detect a position of the door, wherein the door is pivotable between a closed position and an open position, wherein the door is configured to cover the replenishment port of the body in the closed position and unobstruct the replenishment port of the body in the open position, and wherein the system controller is configured to control the intensity of the light source according to the position of the door.

18. A door system for a replenishment door of a vehicle, the door system comprising:

a body having a replenishment port and a latch opening, the replenishment port being configured for receiving a charging plug or refuel nozzle to replenish the vehicle;

a door pivotably attached to the body with a hinge, the door being pivotable between a closed position and an open position;

a controller;

a first sensor configured to detect a position of the door;

a second sensor configured to detect at least one operating condition of the door system; and a latch assembly configured for securing the door to the housing in the closed position, wherein a latch aperture is configured for use with the latch assembly, the latch assembly comprising:

a housing;

a light ring extending from the housing to define a cylindrical protrusion, wherein the light ring is concentric with the latch aperture; and a light source disposed within the housing and configured to project light through the housing and the light ring so that at least a portion of the body adjacent the latch opening is illuminated, wherein the controller is configured to control an intensity of the light source in response to the at least one operating condition detected by the second sensor when the door is detected to be in an open position by the first sensor, wherein the controller is configured to turn the light source off when the first sensor detects the door in a closed position.

19. The door system of claim 18, wherein the at least one operating condition detected by the second sensor is at least one of ambient light intensity and replenishment status.

* * * * *